No. 750,933. PATENTED FEB. 2, 1904.
H. P. BALTZER.
VEHICLE TONGUE.
APPLICATION FILED SEPT. 5, 1903.
NO MODEL.
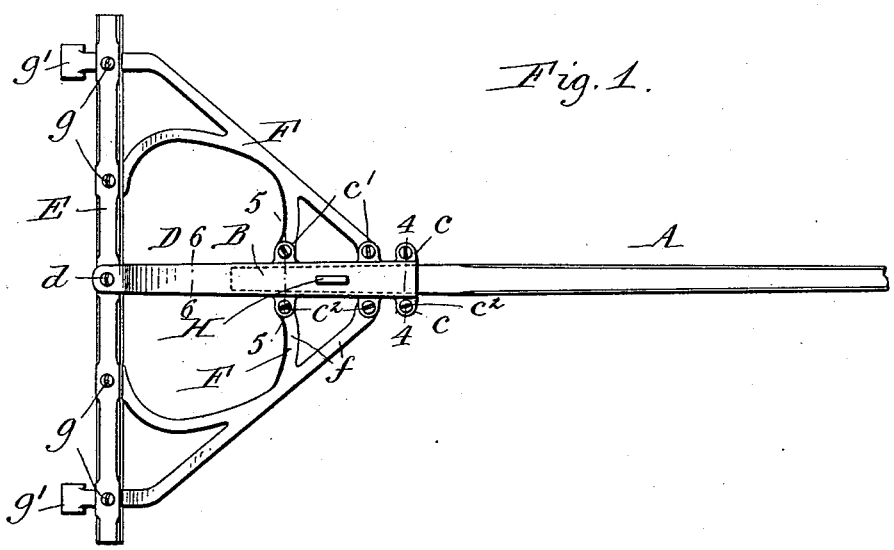
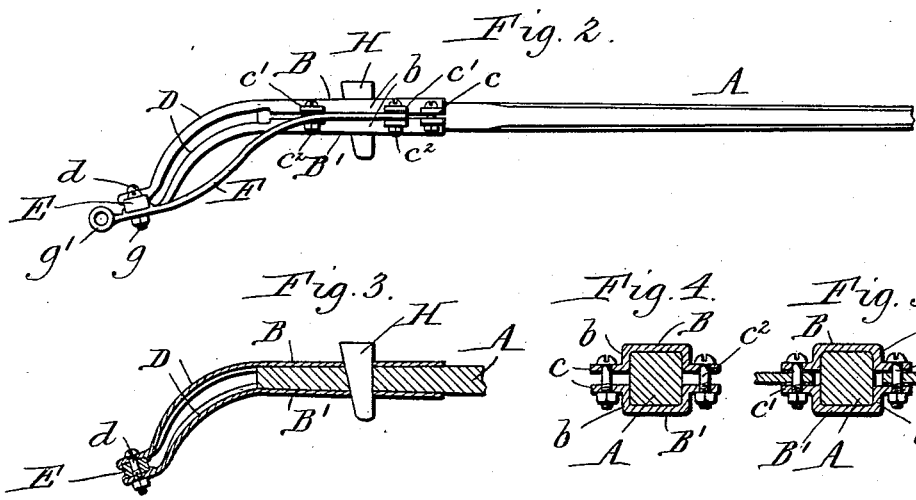
Witnesses:
E. A. Volk.
P. W. Bonner
H. P. Baltzer, Inventor.
By Wilhelm Bonner
Attorneys.

No. 750,933. Patented February 2, 1904.

UNITED STATES PATENT OFFICE.

HENRY P. BALTZER, OF HAMBURG, NEW YORK.

VEHICLE-TONGUE.

SPECIFICATION forming part of Letters Patent No. 750,933, dated February 2, 1904.

Application filed September 5, 1903. Serial No. 172,075. (No model.)

*To all whom it may concern:*

Be it known that I, HENRY P. BALTZER, a citizen of the United States, residing at Hamburg, in the county of Erie and State of New York, have invented new and useful Improvements in Vehicle-Tongues, of which the following is a specification.

This invention relates to a wagon or vehicle tongue of that kind in which the pole or tongue proper is removably secured in a socket connected to the tongue-hounds.

The object of the invention is to provide a pole-socket and tongue-hounds of simple, strong, and inexpensive construction, which securely and firmly hold the pole, but permit the ready attachment and detachment of the same, and to make the pole-socket adjustable in size, whereby it can be contracted to properly fit and firmly hold the pole when the same has worn or worked loose or whereby it can be enlarged or contracted to firmly hold poles which vary somewhat in cross-section.

In the accompanying drawings, Figure 1 is a plan view of a vehicle-tongue and tongue-hounds embodying the invention. Fig. 2 is a side elevation thereof. Fig. 3 is a fragmentary longitudinal vertical section thereof. Figs. 4 and 5 are transverse sections thereof, on an enlarged scale, in lines 4 4 and 5 5, respectively, Fig. 1. Fig. 6 is a transverse section thereof in line 6 6, Fig. 1.

Like letters of reference refer to like parts in the several figures.

A represents the detachable pole, which is made of wood or metal, as usual, and may be of any desired shape. The rear portion of the pole is preferably rectangular in cross-section and tapers somewhat toward the rear end. The pole-socket consists of upper and lower sections or members B and B', having horizontal plates or portions which bear, respectively, on the top and bottom faces of the pole, and side flanges or portions $b$, which project toward each other and embrace the sides of the pole. The socket is relatively long and tapers toward its rear end to receive and snugly fit the tapered rear portion of the pole. While the socket and rear portion of the pole are preferably rectangular in cross-section, they could be made of circular, oval, or other cross-sectional shape. The sides or side flanges of the two socket-sections are provided with laterally-projecting perforated ears $c\ c'$, through which pass vertical connecting-bolts or screws $c^2$. The sections of the socket can be drawn together more or less to fit and hold the pole rigidly from play in the socket by tightening the connecting-bolts. The ears $c'$ and their bolts also constitute means for attaching the tongue-hounds to the pole-socket, as hereinafter explained.

The two sections of the pole-socket are provided with rearwardly-extending integral portions or straps D, the rear ends of which embrace and are secured by a bolt $d$ or otherwise to a cross-bar E. The straps D curve downwardly to their connection with the cross-bar and to stiffen the same against straightening or bending out of shape are of concavo-convex or trough shape in cross-section, as shown in Fig. 6, or, if preferred, the flanges $b$, forming the sides of the pole-socket, could be extended rearwardly along the sides of the straps. The sections of the socket, together with the straps D, can be economically made of cast or malleable iron or stamped or pressed into the described form from sheet metal.

F represents the tongue hounds or braces, which may be of any suitable form. Each hound is preferably bifurcated at its front and rear ends. The front branches $f$ of the braces have eyes which are inserted between the ears $c'$ on the sections of the pole-socket, to which they are secured by the connecting-bolts $c^2$, passing through the ears and eyes. One or more washers $f'$ preferably surround the connecting-bolts between each brace-eye and the ears to which it is connected, thus enabling the ears to be clamped tightly on the eyes and yet allowing the adjustment of the socket to fit the pole by removing or inserting washers, as found necessary. The bifurcated rear ends of the hounds are rigidly secured to the cross-bar E by bolts $g$ or in any other suitable manner, and the rear ends of the outer branches extend to the rear of the cross-arm and are provided with eyes $g'$ for the thill-coupling bolts or with coupling members of other form.

The pole is removably secured in the pole-socket by a vertical wedge or key H, which passes through holes in the upper and lower socket-sections and pole. When the wedge is driven into place, its inclined face tends to draw the pole tightly into the pole-socket, thus aiding in firmly securing the pole. The wedge can be easily removed to detach the pole by tapping it on the lower end with a wrench or other device.

The described construction is strong and rigid and affords a desirable means for quickly and easily attaching and detaching the pole, which when in place in the socket is rigidly and securely connected to the tongue-hounds.

I claim as my invention—

1. The combination of a tapering pole-socket consisting of separate oppositely-arranged U-shaped sections provided with lateral ears, bolts connecting said ears whereby said socket-sections can be adjusted toward and from each other, a pole having a tapering end seated in said socket, and a wedge-shaped key passing through alined holes in said socket and pole for drawing the latter tightly into the socket, substantially as set forth.

2. The combination of a pole, a cross-bar, a socket for said pole consisting of separate sections embracing said pole, and having integral rearward extensions which are connected at their rear ends to said cross-bar, and tongue-hounds connecting said cross-bar and pole-socket, substantially as set forth.

3. The combination of a pole, a cross-bar, a socket for said pole consisting of separate sections embracing said pole and having lateral ears, said socket-sections having integral rearward extensions which are connected at their rear ends to said cross-bar, tongue-hounds connected to said cross-bar and with their front ends arranged between said ears on the socket-sections, and adjusting-bolts for said socket-sections connecting said ears and hounds together, substantially as set forth.

4. The combination of a pole, a cross-bar, a socket for said pole consisting of separate sections each formed of a single piece of sheet metal and having laterally-projecting ears and rearward extensions of trough shape in cross-section, means connecting said rearward extensions to said cross-bar, and tongue-hounds connecting said cross-bar and socket, substantially as set forth.

Witness my hand this 28th day of August, 1903.

HENRY P. BALTZER.

Witnesses:
JNO. J. BONNER,
C. M. BENTLEY.